US009286096B2

(12) United States Patent
Mann

(10) Patent No.: US 9,286,096 B2
(45) Date of Patent: Mar. 15, 2016

(54) SELECTING A VIRTUAL BASIS INPUT OUTPUT SYSTEM BASED ON INFORMATION ABOUT A SOFTWARE STACK

(75) Inventor: James M. Mann, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 186 days.

(21) Appl. No.: 14/112,562

(22) PCT Filed: Apr. 21, 2011

(86) PCT No.: PCT/US2011/033476
§ 371 (c)(1),
(2), (4) Date: Oct. 18, 2013

(87) PCT Pub. No.: WO2012/145006
PCT Pub. Date: Oct. 26, 2012

(65) Prior Publication Data
US 2014/0047443 A1    Feb. 13, 2014

(51) Int. Cl.
*G06F 9/455* (2006.01)
*G06F 9/44* (2006.01)
(52) U.S. Cl.
CPC ........ *G06F 9/45533* (2013.01); *G06F 9/45558* (2013.01); *G06F 9/4401* (2013.01); *G06F 2009/45575* (2013.01)

(58) Field of Classification Search
None
See application file for complete search history.

(56) References Cited

U.S. PATENT DOCUMENTS

| 2004/0221150 | A1 | 11/2004 | Maynard et al. |
| 2007/0186086 | A1 | 8/2007 | Lambert et al. |
| 2008/0059556 | A1* | 3/2008 | Greenspan et al. ........... 709/201 |
| 2010/0115315 | A1 | 5/2010 | Davis et al. |
| 2010/0169629 | A1* | 7/2010 | Zhang et al. ...................... 713/1 |
| 2010/0199062 | A1 | 8/2010 | Sancho-Dominguez et al. |

FOREIGN PATENT DOCUMENTS

EP    0543610    5/1993

OTHER PUBLICATIONS

International Searching Authority, International Search Report and Written Opinion, Appln No. PCT/US2011/033476, Date of Mailing Jan. 2, 2012, 9 p.

* cited by examiner

*Primary Examiner* — Meng An
*Assistant Examiner* — Jorge A Chu Joy-Davila
(74) *Attorney, Agent, or Firm* — Hewlett-Packard Patent Dept.

(57) ABSTRACT

A virtual basic input output system can be selected from different virtual basic input output systems. The selection of the virtual basic input output system is by a controller and the selection can be based on a software stack or user interaction.

17 Claims, 6 Drawing Sheets

SELECTING A VIRTUAL BASIS INPUT OUTPUT SYSTEM BASED ON INFORMATION ABOUT A SOFTWARE STACK

CROSS-REFERENCE TO RELATED APPLICATION

This application is a national stage application under 35 U.S.C. §371 of PCT/US2011/033476, filed Apr. 21, 2011.

BACKGROUND

A virtual machine monitor or hypervisor can allow different virtual machines that may include different operating systems to run concurrently on a computing device. Multiple instances of a variety of operating systems may share the virtualized hardware resources. A computing device can include a basic input output system (BIOS) to test hardware at startup, start an operating system or support the transfer of data among hardware.

BRIEF DESCRIPTION OF THE DRAWINGS

Some embodiments of the invention are described with respect to the following figures.

DETAILED DESCRIPTION

Figure 1:
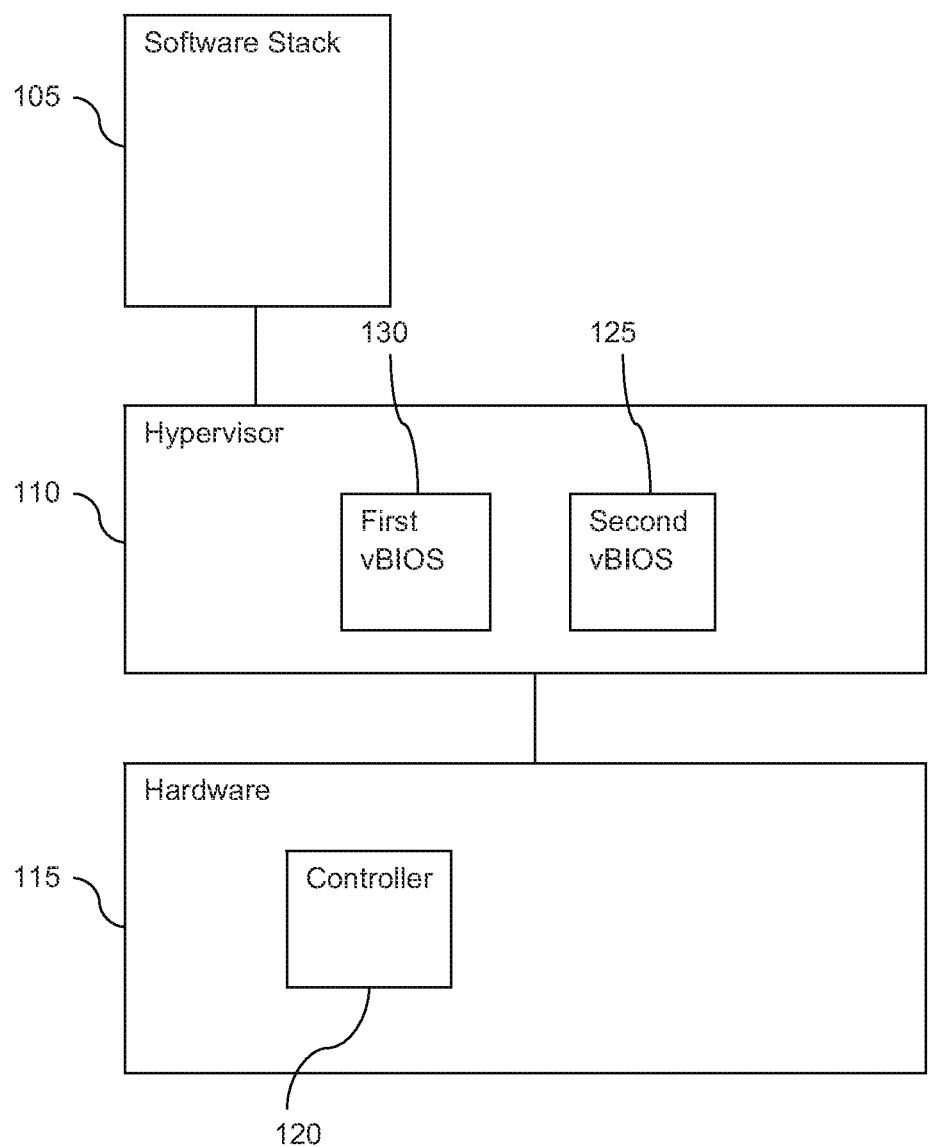
FIG. 1 is a block diagram of a computing device including a hypervisor according to an example implementation.

Computing devices include a basic input output system (BIOS) to test hardware at startup, start an operating system or support the transfer of data among hardware. A BIOS can also include Extensible Firmware Interface (EFI), Unified Extensible Firmware Interface (UEFI) or other firmware for a computing system. Computing devices can include a hypervisor or virtual machine monitor to control a virtual machine. A hypervisor can manage a virtual machine that includes a software stack and a virtual BIOS (vBIOS). The software stack is an operating system or an application that can be executed in a virtual machine, such as Unix, Linux, a word processor, or spreadsheet. The hypervisor can be hardware or software that manages multiple virtual machines such as operating systems or multiple instances of the same virtual machine on a computer device. The hypervisor can manage the computing device's processor, memory, and other resources to allocate to each operating system.

A BIOS on a computing device is capable of communicating with the hardware on the computing device. An operating system or application has to be able to communicate with the BIOS. Because of many different hardware configurations or operating systems that can be used with a computing device a BIOS may include many instructions or routines that are not needed for an operating system or a system with a hardware configuration that does not include a component but a virtual BIOS (vBIOS) can be specific for an operating system or hardware configuration.

If a virtual BIOS is for a specific operating system or a specific hardware configuration, features can be included in the virtual BIOS specific to the operating system or the hardware configuration. In the event the real BIOS does not support a certain BIOS interface required by the operating system or virtual appliance, the virtual BIOS could emulate the required functions. The real BIOS is that which is executed when the device hardware is booted and the virtual BIOS is that which is executed when a virtual machine or virtual appliance is booted.

In one embodiment, a computing device can include a software stack and a hypervisor to manage the execution of the software stack. The computing device can also include a controller to select one of a first vBIOS and a second vBIOS based on the software stack. The first vBIOS and the second vBIOS are different. The difference between the first vBIOS and the second vBIOS may be support for a software stack feature or a hardware component.

The software stack feature may be for example authentication. The authentication routines may use a Trusted Platform Module (TPM) to authenticate the user and the hardware on the system as well as perform encryption and decryption. Authentication may also allow a single sign on, where a user is authenticated once and the user is automatically authenticated for other services.

In one embodiment, a method can provide a virtual BIOS to a virtual machine. The method can include a processor to receive information about a software stack. The method can select a virtual BIOS from a plurality of different virtual BIOS based on the information about the software stack. The method can generate a virtual machine including the software stack and the virtual BIOS selected.

FIG. 1 is a block diagram of a computing device including a hypervisor according to an example implementation. The computing device can include a hypervisor 110. The hypervisor can manage the execution of a software stack 105. The hypervisor 110 may include a first virtual basic input output system (vBIOS) 130 and second vBIOS 125.

The software stack 105 can execute on the hypervisor 110. The software stack 105 can be for example an operating system or an application. For example the operating system may be WebOS, Unix, Linux or another operating system.

The computing system includes hardware 115 with a component such as a controller 120. The controller 120 can select a vBIOS from a first vBIOS 130 and a second vBIOS 125 based on the software stack 105. The first vBIOS 130 and the second vBIOS 125 are different.

In determining which vBIOS to select the controller 120 can determine if the software stack 105 has a feature and select a vBIOS based on whether the vBIOS supports the feature. For example if the software stack 105 supports user authentication such as single log on then the controller can select a vBIOS that supports user authentication. The controller 120 can determine if the software stack 105 does not support a feature and select a vBIOS based on whether the vBIOS supports the feature. For example if the software does not support optical disk drives then the controller 120 may select a vBIOS that does not support an optical disk drive. Another example may be a software stack that does not support Advanced Configuration and Power Interface (ACPI) and therefore the vBIOS does not support ACPI.

In one embodiment a software stack may come with a vBIOS that is used with the software stack 105 when the software stack 105 is stored on a computer readable medium of the computing device. For example if the software stack 105 is an operating system that is installed on the computing device to be executed as a virtual machine then a vBIOS may be provided with the software stack 105. For example the software stack may be installed by downloading from a server, from an external computer readable medium or another source. The vBIOS for a software stack may be stored on the same computer readable medium as the software stack or may be included with the software stack if the software stack is downloaded and installed on the computing system to be selected by the controller 120 if generating a virtual machine with the software stack 105. If a specific vBIOS is not selected by the controller 120, then the controller 120 may select a generic vBIOS that is not specific to the software stack or the hardware components. If a generic vBIOS is selected the efficiency of the virtual machine may be decreased as compared to a vBIOS specific for the software stack or the hardware since a generic vBIOS may have to execute routines that would not be used by the software stack or the hardware components.

Figure 2:
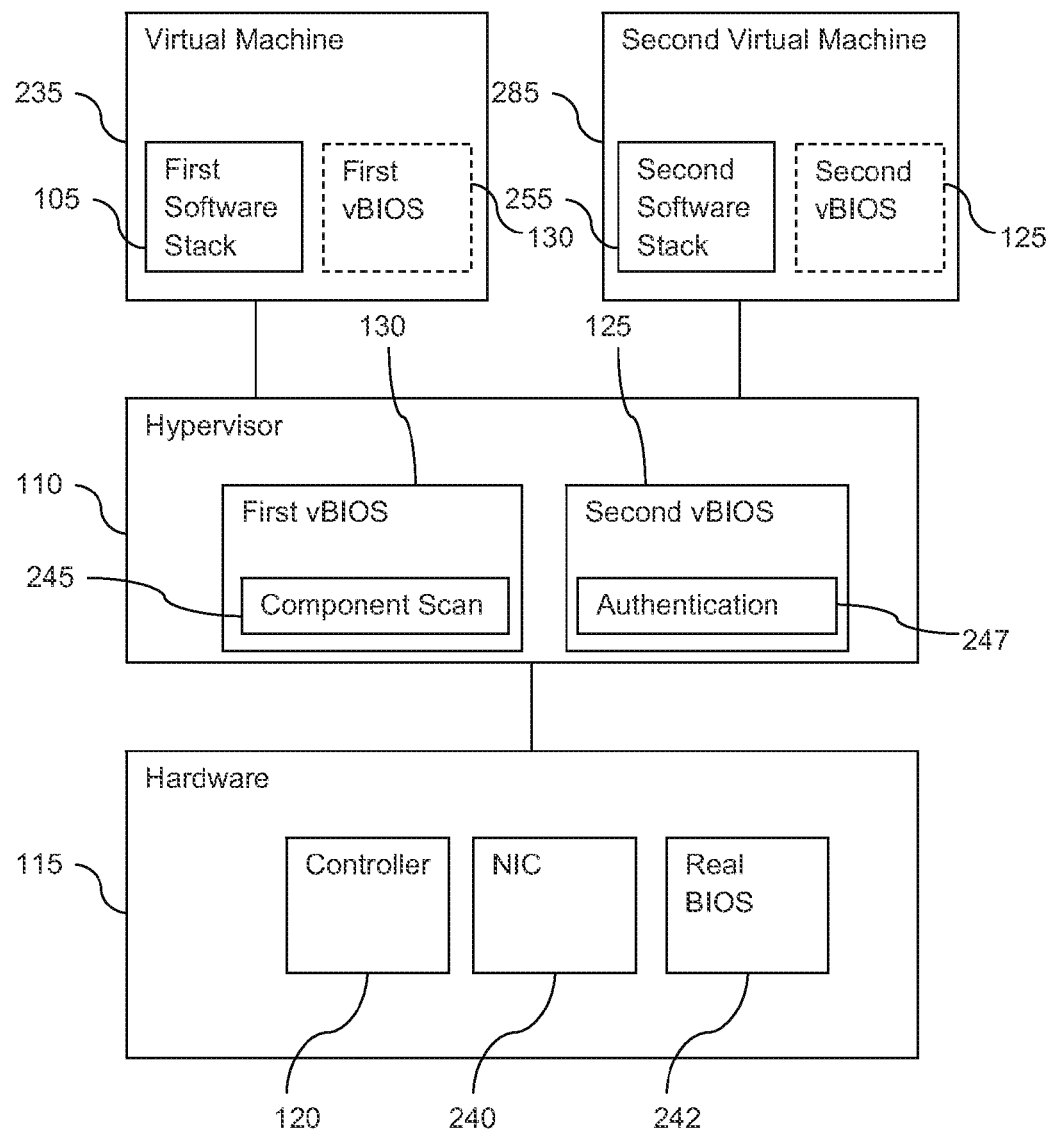
FIG. 2 is a block diagram of a computing device including a hypervisor according to an example implementation.

FIG. 2 is a block diagram of a computing device including a hypervisor 110 according to an example implementation. The hardware 115 of the computing system may include a controller 120 and a real BIOS 242. The real BIOS 242 can be code that is executed at boot up to initialize the physical hardware 115 of the computing device. The computing device can include a second software stack 255. The second software stack 255 may be a second operating system different from the first software stack 105 or may be a second instance of the first software stack 105. The second software stack 255 may also be an application. The controller 120 can select a virtual basic input output system (vBIOS) from a first vBIOS 130 and a second vBIOS 125 based on the second software stack.

If the controller 120 has selected a vBIOS, the hypervisor 110 can manage a virtual machine 235 based on the first software stack 105. The virtual machine may include the first software stack 105 and the first vBIOS 130 if the controller 120 selected the first vBIOS 130 for the virtual machine 235. In another embodiment, if the controller selected the second vBIOS, a second virtual machine 285 can include a second software stack 255 and the second vBIOS 125.

The controller may look at different criteria to select the vBIOS if generating a virtual machine. The controller may determine that the software stack does not support a hardware component. If the software stack does not support the hardware component then the controller may select a vBIOS that does not scan for that hardware component. For example if the software stack is an operating system that does not support an optical disk drive the controller can select a vBIOS such as the second vBIOS 125 that does not include a scan 245 for the component that is not supported by the software stack which may save time when starting the virtual machine or booting the computing device.

The controller 120 may determine that a software stack supports routines or components related to authentication. If for example the software stack supports authentication then controller may select a vBIOS such as the second vBIOS 125 that includes authentication 247 routines. The ability to add features to the vBIOS for use by the virtual machine can allow features to be added to a software stack that may not have BIOS support in a computing device but can be supported by a specific vBIOS in a virtual machine.

The vBIOS may come with the software stack, may be preinstalled in the computing device, or may be downloaded from a network. The computing device may include a network connection 240. The network connection 240 may connect the computing device to another computing device such as a server on for example a private network or to the internet. A server can be a computer or program that responds to requests from the computing device. The controller 120 may select a vBIOS that is not stored locally on the computing device. The controller 120 may use the network connection 240 to request from a server on the network or internet a vBIOS for example if the controller 120 selected the second vBIOS 125 and the second vBIOS 125 was not stored on the computing device the controller could request the second vBIOS 125 from the a server on network.

Figure 3:
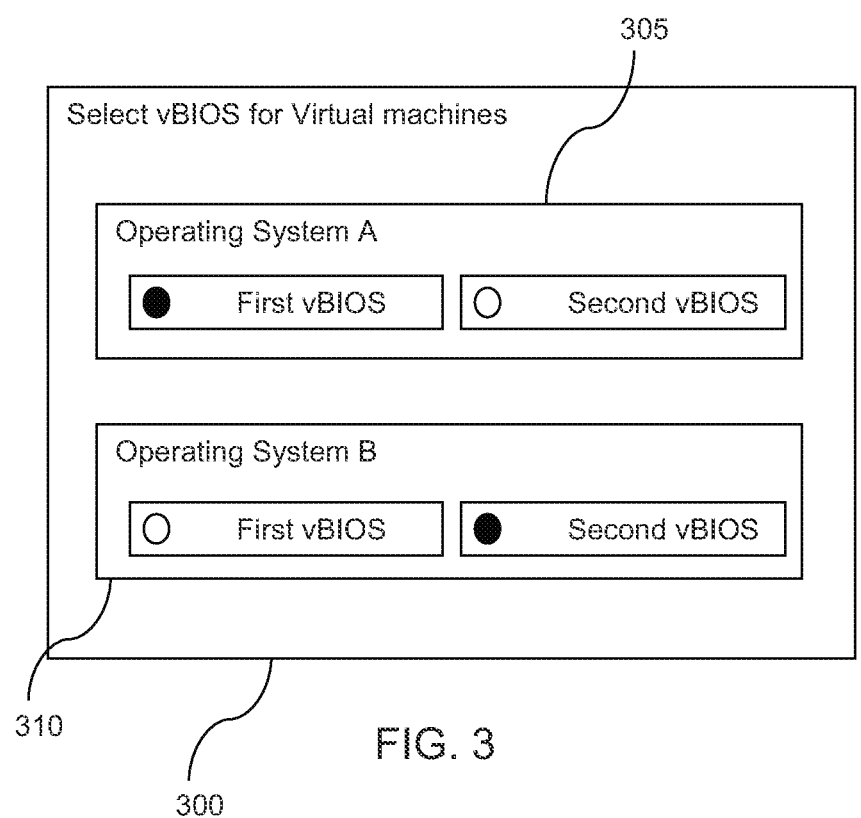
FIG. 3 is an example implementation of a user interface.

FIG. 3 is an example implementation of a user interface. A user interface 300 can be used to display to the user which vBIOS was selected by the controller for a software stack. For example if a system includes a first software stack and a second software stack the user interface may display a box representing a first software stack identified by first operating system A 305 and a box representing the representing a second software stack identified by second operating system B 310. If, for example, the controller selected the first vBIOS for operating system A 305 it may be indicated for example by a radio button or some other indicator. The user interface may also allow the user to select a vBIOS to be used by a virtual machine. In one embodiment, the user interface may not allow a user to select a vBIOS that is incompatible with the software stack for example if the vBIOS does not support some of the features of the software stack the user interface may not allow a user to select that vBIOS for the virtual machine with that software stack.

If virtual machine is generated with a software stack and a vBIOS then the hypervisor can manage the execution of the software stack and the vBIOS. When initiating the virtual machine code the vBIOS is executed and control is then passed to the software stack. For example if the software stack is an operating system the vBIOS would pass control to the operating system and the hypervisor can manage the execution of the operating system on the computing device.

Figure 4:
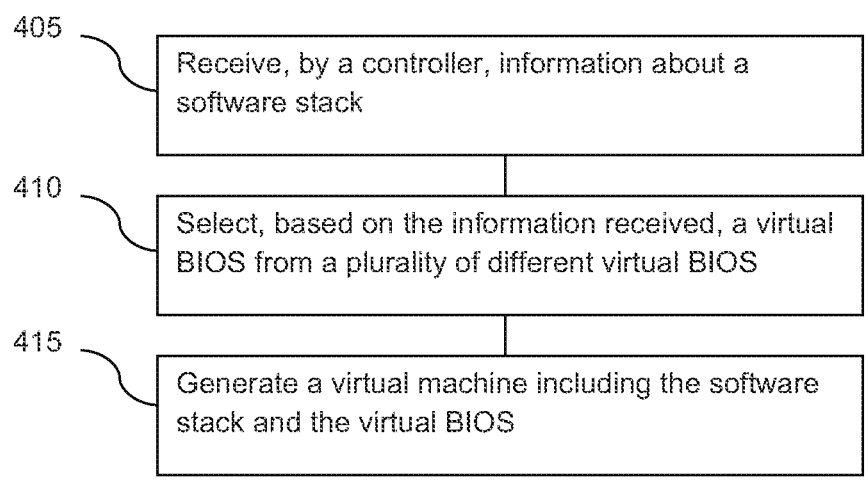
FIG. 4 is a flow diagram of a method of selecting a virtual BIOS according to an example implementation.

FIG. 4 is a flow diagram of a method of selecting a virtual BIOS according to an example implementation. The method can be performed by a device such as the computing device of FIG. 1. A controller can receive information about a software stack at 405. The controller may be the controller 120 of FIG. 1. The information received by the controller can be used to select a virtual BIOS from a plurality of different virtual BIOS at 410. The information may be a list of features that are supported by the software stack or a list of components that are needed to support the features of the software stack. The controller can select the virtual BIOS based on the physical hardware of a computing device if for example the list of components that are needed to support the features of the software stack are provided. The selected vBIOS can be used to generate a virtual machine including the software stack and the vBIOS at 415.

Figure 5:
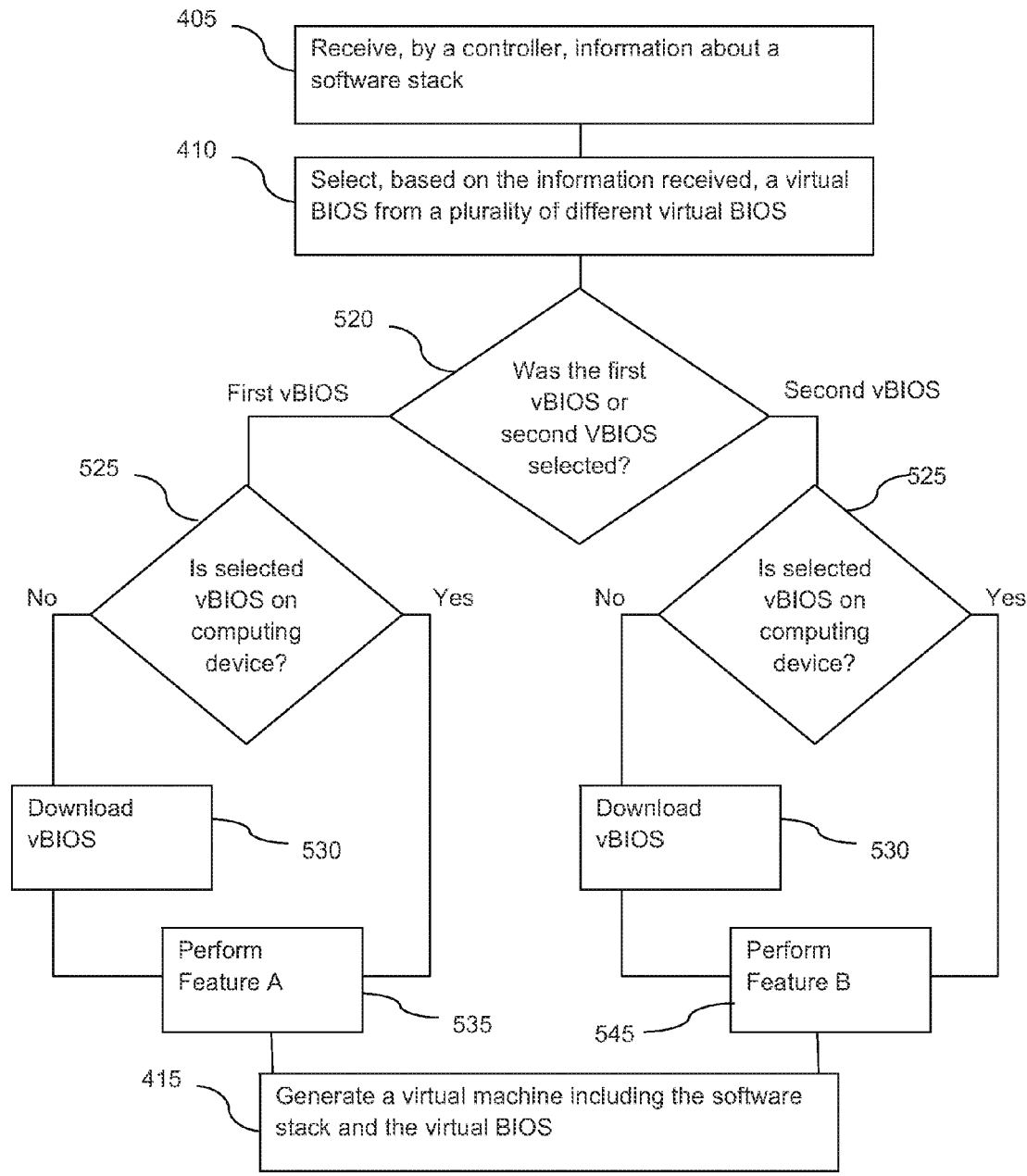
FIG. 5 is a flow diagram of a method of selecting a virtual BIOS according to an example implementation.

FIG. 5 is a flow diagram of a method of selecting a virtual BIOS (vBIOS) according to an example implementation. A controller can receive information about a software stack at 405 and based on the information select a vBIOS from a plurality of different vBIOS. The method can determine whether the first vBIOS or the second vBIOS was selected at 520. The method may continue to determine if the vBIOS selected is on the computing device at 525. If the vBIOS selected is not on the computing device the method can download the selected vBIOS at 530. The computing system may download the vBIOS from for example a server on a network. Depending on the vBIOS selected a feature provided by the vBIOS may be different. For example if the first vBIOS is selected then feature A may be performed at 535 and if the second vBIOS is selected feature B may be performed at 545. A feature may be authenticating a user if the first vBIOS is selected from the plurality of different virtual BIOS and not authenticating a user if a second virtual BIOS is selected from the plurality of different virtual BIOS.

Figure 6:
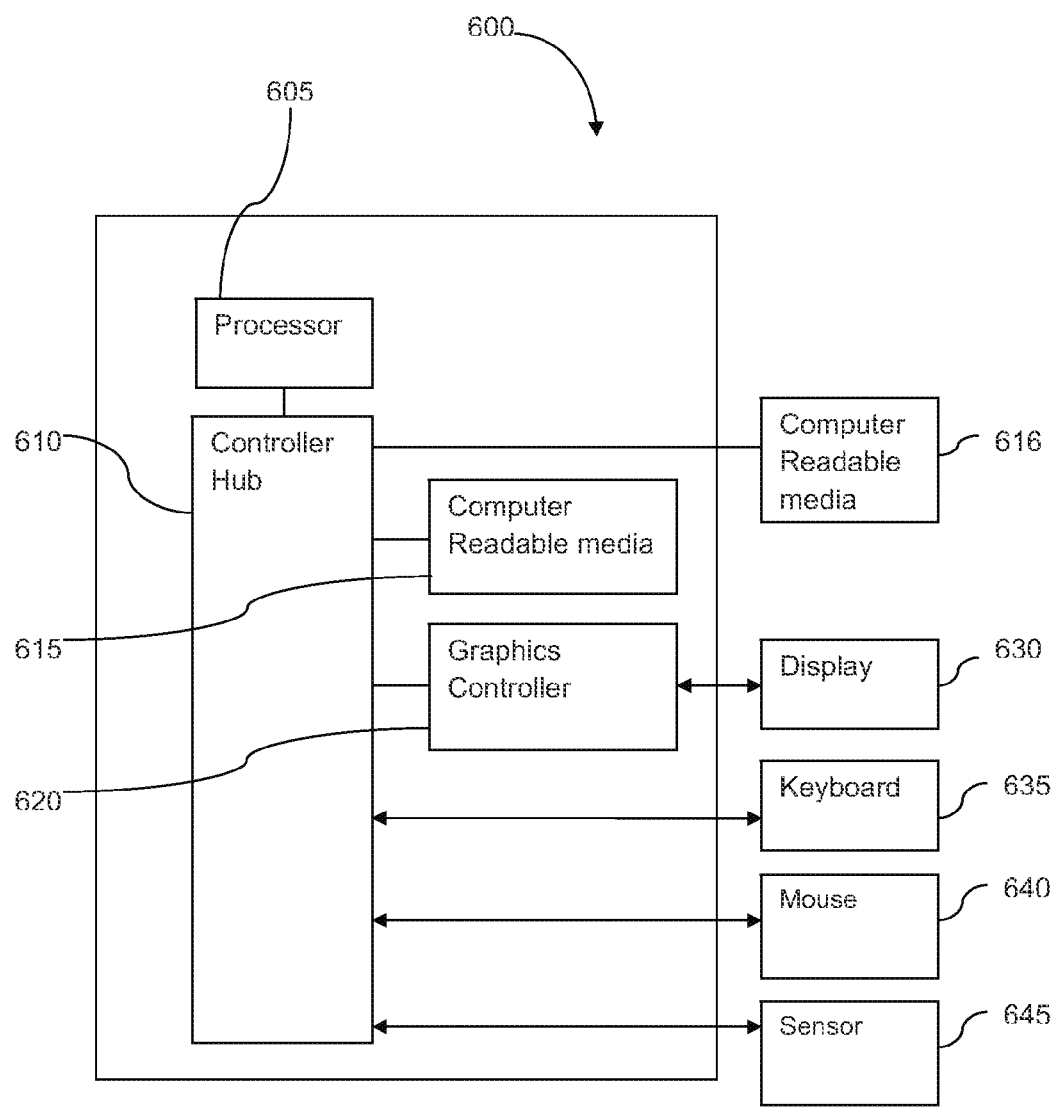
FIG. 6 is a block diagram of a computing device according to an example implementation.

FIG. 6 is a block diagram of a computing device according to an example implementation. The computing device 600 may include a processor 605. The processor 605 may be a controller. The processor 605 may be connected to a controller hub 610. The controller hub 610 may be connected to input devices, such as a keyboard, a mouse, a sensor or another input device. The controller hub 610 may also be connected to output devices such as a graphics controller 620 that is connected to a display 630. The controller hub may also connect to computer readable medium 615 or 616. The computer readable medium can include code that if executed may cause the processor 605 to receive information about a software stack and select, based on the information received, a virtual BIOS from a plurality of different virtual BIOS. The code may then cause the processor to generate a virtual machine including the software stack and the selected virtual BIOS. The computer readable medium 615 or 616 may also include code that if executed by the processor causes the processor 605 to request from a server the selected virtual BIOS. The code on the computer readable medium 615 or 616 may also include code that if executed causes a processor to authenticate a user if a first virtual BIOS is selected from the plurality of different virtual BIOS and not authenticating a user if a second virtual BIOS is selected from the plurality of different virtual BIOS.

The techniques described above may be embodied in a computer-readable medium for configuring a computing device to execute the method. The computer readable media may include, for example and without limitation, any number of the following: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc.; and the Internet, just to name a few. Other new and various types of computer-readable media may be used to store and/or transmit the software modules discussed herein. Computing devices may be found in many forms including but not limited to mainframes, minicomputers, servers, workstations, personal computers, notepads, personal digital assistants, various wireless devices and embedded systems, just to name a few.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A computing device comprising:
a software stack;
a hypervisor to manage execution of the software stack; and
a controller comprising a processor to:
determine, based on information about the software stack, that the software stack supports a feature that is supported by a first virtual basic input output system (vBIOS) but not a second vBIOS, wherein the first vBIOS and the second vBIOS are different;
select, based on the determining, the first vBIOS from among a plurality of vBIOS comprising the first vBIOS and the second vBIOS; and
generate a first virtual machine including the software stack and the first vBIOS.

2. The computing device of claim 1, wherein the information about the software stack includes at least one of a feature or component supported by the software stack.

3. The computing device of claim 1, further comprising a second software stack, wherein the controller is to:
select, based on information about the second software stack, the second vBIOS from among the plurality of vBIOS, and
generate a second virtual machine including the second software stack and the second vBIOS.

4. The computing device of claim 3, wherein the hypervisor is to manage execution of the first and second virtual machines.

5. The computing device of claim 1, further comprising a network connection to request the second vBIOS from a server.

6. The computing device of claim 1, wherein the second vBIOS includes support for a software stack feature not supported in the first vBIOS.

7. The computing device of claim 1, wherein the second vBIOS includes support for a hardware component not supported in the first vBIOS.

8. The computing device of claim 1, wherein the controller is to select a third vBIOS from the plurality of vBIOS based on the controller determining that the software stack does not support a given feature and that the third vBIOS is without a routine supporting the given feature.

9. The computing device of claim 1, wherein the first vBIOS is to be executed in the first virtual machine in response to booting of the first virtual machine.

10. A method of providing a virtual basic input output system (vBIOS) to a virtual machine, comprising:
receiving, by a controller comprising a processor, information about a software stack;
determining, by the controller based on the information about the software stack, that the software stack supports a feature that is supported by a first vBIOS but not a second vBIOS, wherein the first vBIOS and the second vBIOS are different;
selecting, by the controller based on the determining, the first vBIOS from a plurality of different vBIOS; and
generating, by the controller, the virtual machine including the software stack and the selected first vBIOS.

11. The method of claim 10, further comprising selecting the second vBIOS from the plurality of different vBIOS based on the controller determining that the software stack does not support a given feature and that the second vBIOS is without a routine supporting the given feature.

12. The method of claim 10, further comprising requesting from a server the selected first vBIOS.

13. The method of claim 10, further comprising:
receiving, by the controller, information about a second software stack;
selecting, by the controller based on the information about the second software stack, the second vBIOS from the plurality of different vBIOS; and
generating, by the controller, a second virtual machine including the second software stack and the second vBIOS.

14. The method of claim 13, further comprising:
managing, by a hypervisor, execution of the virtual machines.

15. The method of claim 10, further comprising:
executing the selected first vBIOS in the virtual machine in response to booting of the virtual machine.

16. A non-transitory computer readable medium comprising code that upon execution causes a controller to:
receive information about a software stack;
determine, based on the information about the software stack, that the software stack supports a feature that is supported by a first virtual basic input output system (vBIOS) but not a second vBIOS, wherein the first vBIOS and the second vBIOS are different;
select, based on the determining, the first vBIOS from a plurality of different vBIOS; and
generate a virtual machine including the software stack and the selected first vBIOS.

17. The non-transitory computer readable medium of claim 16, wherein the code upon execution causes the controller to select a third vBIOS from the plurality of different vBIOS based on determining that the software stack does not support a given feature and that the third vBIOS is without a routine supporting the given feature.

\* \* \* \* \*